Dec. 24, 1957 A. L. PAINTER 2,817,091
MOBILE SANITARY TRAILER
Filed May 22, 1957 3 Sheets-Sheet 1

INVENTOR
*Albert Lee Painter*

BY
*Mason, Fenwick & Lawrence*
ATTORNEYS

Dec. 24, 1957  A. L. PAINTER  2,817,091
MOBILE SANITARY TRAILER
Filed May 22, 1957  3 Sheets-Sheet 2
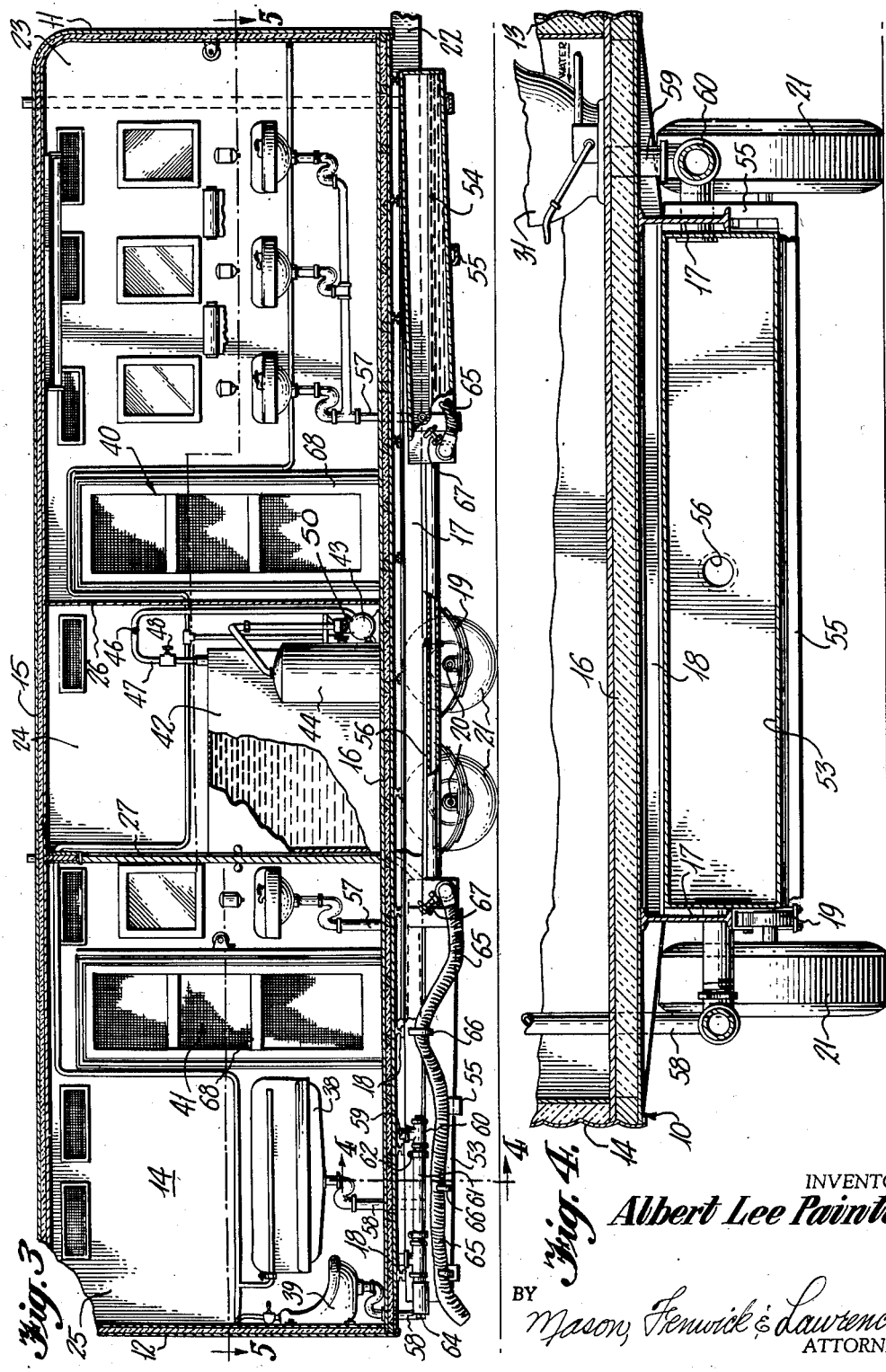
INVENTOR
*Albert Lee Painter*
BY
*Mason, Fenwick & Lawrence*
ATTORNEYS

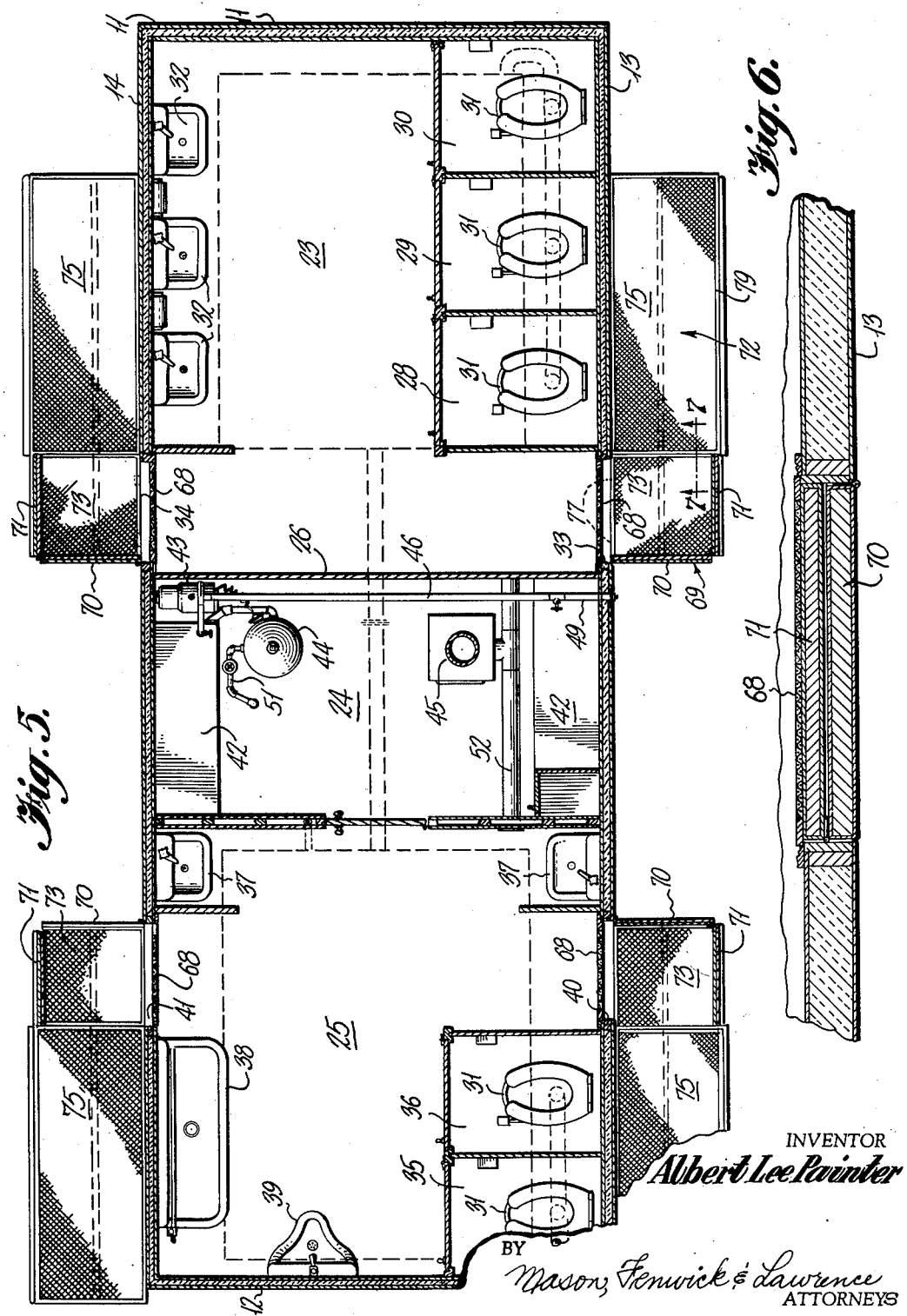

United States Patent Office 2,817,091
Patented Dec. 24, 1957

2,817,091

MOBILE SANITARY TRAILER

Albert Lee Painter, Washington, D. C., assignor to American Trailer Co., Inc., Washington, D. C., a corporation of Delaware Application May 22, 1957, Serial No. 660,911

7 Claims. (Cl. 4—1)

The present invention relates to a mobile sanitary trailer unit designed to provide sanitary toilet facilities for large gatherings.

Governmental units such as states and municipalities are beset with many problems of environmental sanitation in connection with outdoor recreation and amusement. In areas which are especially set aside for athletic exhibitions, fairs, carnivals, travelling shows, and the like, permanent comfort stations are provided by some communities for the use of the patrons. Such permanent installations are particularly feasible in connection with permanent state and county fair grounds, athletic playgrounds, and the like. However, since travelling amusement groups, such as carnivals, circuses and fairs, spend only a few days in a city or town and do not always occupy the same site, it is not usually economically feasible to build permanent comfort stations to serve such areas.

The impracticability of providing permanent comfort stations at such locations and the difficulty of enforcing such sanitary regulations as may exist, lead to the use of improvised, unsanitary facilities which create inconvenience, offense, and a definite health hazard.

An object of the present invention is the provision of a novel mobile trailer unit designed to provide sanitary toilet facilities for both men and women, which can be conveniently transported from one location to another.

Another object of the present invention is the provision of a novel trailer unit which may be conveniently moved to different locations by trucks or automobiles, which incorporates in a novel manner sanitary toilet facilities and temporary retention facilities for liquid wastes from the toilet fixures, whereby the wastes may be ultimately discharged directly into municipality sewer systems.

Another object of the present invention is the provision of a novel arrangement of retention tanks for liquid wastes in a mobile sanitary trailer whereby the load distribution relative to the axles of the trailer is automatically preserved in a desired relationship.

Other objects, advantages and capabilities of the present invention will become apparent from the following detail description, taken in conjunction with the accompanying drawings illustrating one preferred embodiment of the invention.

In the drawings:

Figure 3 is a longitudinal vertical section view taken along the line 3—3 of Figure 2;

Fig. 4 is an enlarged fragmentary transverse vertical section view taken along the line 4—4 of Figure 3;

Figure 5 is a horizontal section view taken along the line 5—5 of Figure 3;

Figure 6 is an enlarged fragmentary horizontal section view taken through the door frame and adjacent side wall portions of the trailer at one of the doors with the door screening panels folded into nested position for transportation of the trailer.

Figure 1:
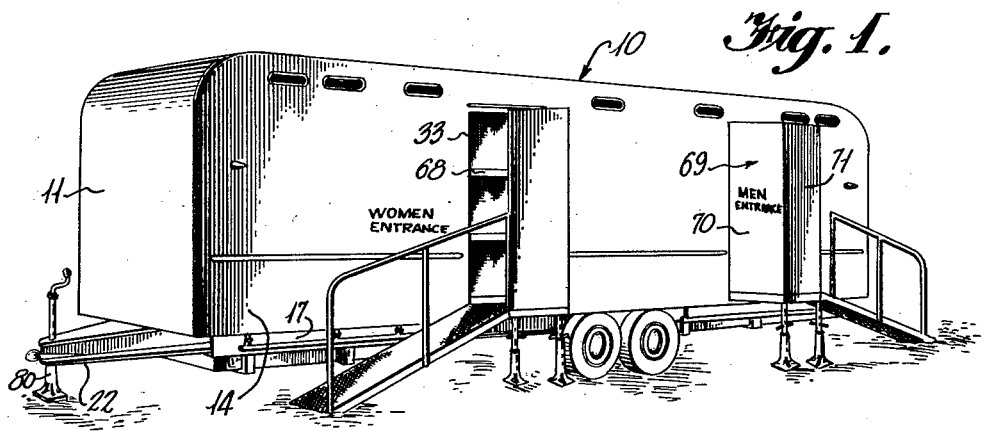
Figure 1 is a perspective view of a mobile sanitary trailer embodying the present invention, illustrated in set up condition for use.
Figure 2:
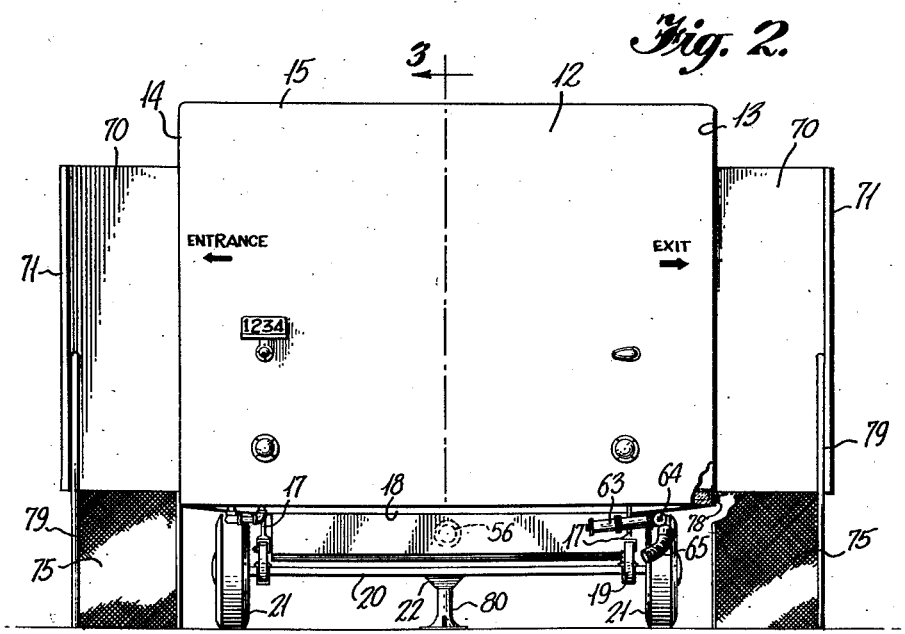
Figure 2 is a rear elevation view of the mobile sanitary trailer.

Referring to the drawings wherein like reference characters designate corresponding parts throughout the several figures, the mobile sanitary trailer of the present invention comprises a trailer body indicated generally by the reference character 10, having a front wall 11, a rear wall 12, side walls 13 and 14, a roof 15 and a floor 16, all of substantially conventional construction. The trailer body 10 is supported on a conventional trailer bed of the type including a pair of laterally spaced longitudinal underframe I beams 17 interconnected at spaced locations by transverse cross bracing I beams 18. The longitudinal I beams 17 in the preferred embodiment each support a longitudinally spaced pair of axle springs 19 to which a pair of transverse axles 20 are coupled for journalling the trailer wheels 21. As illustrated in the drawings, the trailer wheels 21 are positioned adjacent the longitudinal center of the trailer body. The forward ends of the longitudinal I beams 17 project forwardly of the front wall 11 of the trailer body and converge forwardly to form a draw bar 22 for attachment of the trailer to the towing vehicle.

The interior of the trailer body 10 is preferably divided into three compartments indicated by the reference characters 23, 24 and 25 by two transverse partitions 26 and 27. The forwardmost compartment 23 forms the women's toilet, the central compartment 24 forms the utility room, and the rearmost compartment 25 forms the men's toilet. Within the women's toilet compartment 23 are provided three toilet booths 28, 29 and 30 each having a water closet 31 therein, preferably arranged alongside the side wall 13, and three lavatories 32, preferably arranged along the opposite trailer side wall 14. Transversely aligned entrance and exit openings 33 and 34, respectively are provided in the trailer side walls 13 and 14 adjacent the transverse partition 26 for the women's toilet compartment 23. Similarly, a pair of toilet booths 35 and 36 are provided in the men's toilet compartment 25, preferably alongside the trailer side wall 13 and a pair of lavatories 37 are provided in transversely aligned relation on side walls 13 and 14. Additionally, an adult urinal 38 is mounted on the trailer side wall 14 and a boy's urinal 39 is mounted on the trailer rear wall 12 and transversely aligned entrance and exit openings 40 and 41, respectively are formed in the side walls 13 and 14 for the men's toilet compartment 25.

The utility room compartment 24 located between the trailer compartments 23 and 25 is substantially centered over the trailer axles 20 and houses a pair of water storage tanks 42 supported alongside the opposite trailer side walls 13 and 14, each preferably of 250-gallon capacity, an electrical water pump 43, a pressure tank 44, and an air heater 45. The water storage tanks 42 are interconnected by an overhead pipe 46 having legs 47 in which manual valves 48 are provided extending to the tanks 42 and an extension 49 extending through the side wall 13 of the trailer body to provide an external coupling through which water can be supplied to the tanks 42. The pipe 46 is also connected to the water pump 43 and a pipe 50 extends from the pump 43 to the pressure tank 44. An outlet pipe 51 from the pressure tank 44 supplies water under pressure to all of the fixtures in the toilet compartments 23 and 25. The heater 45 is provided with an outlet pipe 52 which opens through the partitions 26 and 27 into the toilet compartments 23 and 25 to supply heated air to the latter compartments.

Suspended from the trailer bed in substantially balanced relation to the trailer axles 20 are a pair of rectangular retention tanks 53 and 54, preferably of about 300 gallons capacity each, which are supported from the I beams 17 by means of U-shaped hanger channels 55 whose legs are welded at their ends to the I beams 17 with the horizontal bridge portions of the channels underlying the bottoms of the retention tanks 53, 54. The retention tanks are of slightly smaller area in horizontal cross section than the toilet compartments 23 and 25 and are substantially centered relative to their associated toilet compartments. The retention tanks 53 and 54 are slightly inclined downwardly toward each other to dispose their adjacent ends at a lower level than their relatively remote ends, and an equalizer pipe 56 interconnects their adjacent ends to maintain a substantially equal distribution of liquid wastes in the two retention tanks at all times and insure that the loading on the axles 20 is balanced fore and aft of the axles.

The discharge from the lavatories 32 and 37 and from the urinals 38 and 39 is led through suitable narrow diameter pipes 57 and 58 respectively through the sides of the nearest retention tanks 53 and 54. The discharge from the water closets 31 is led downwardly through pipes 59 to suitable T-fittings 60 located alongside the sides of the retention tanks 53, 54. The T-fittings 60 are connected together by large diameter flexible conduits 61 clamped by suitable split ring clamps 62 to the T-fittings to maintain a water-tight seal at those connections and do away with the usual leaded joints which might be broken by the road shocks encountered by the trailer during transportation. Right angular extensions 63 are connected with the T-fittings 60 and extend around the corners of the retention tanks 53, 54 and through the relatively remote ends of the tanks 53, 54 to convey the fluid wastes into the tanks and have threaded plugs 64 at the elbows of the extensions 63. Flexible draining conduits 65 which may be supported alongside the retention tanks on U-shaped brackets 66 when not in use are also coupled through the side of each retention tank and have a manual control valve 67 at the juncture of each draining conduit 65 with its associated retention tank. The draining conduits 65 are designed to be led into a city sewage system inlet, when the trailer has been transported to a city following use, for discharge of the fluid wastes from the retention tanks 53, 54 directly into the city sewage system and flushing of the retention tanks by removing the plugs 64 and coupling a hose from the city water supply thereto.

Figure 7:
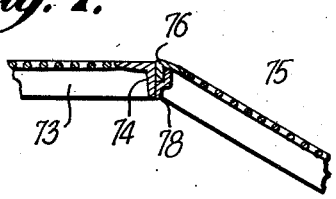
Figure 7 is a fragmentary vertical section view taken along the line 7—7 of Figure 5.

The entrance and exit openings 33, 34, 40 and 41 to the toilet compartments 23 and 25 are provided with hinged screen doors 68 which open inwardly into the compartments 23 and 25. The screen doors 68 are hung flush with the planes of the inner wall surfaces of the trailer body to provide a space in each of the openings 33, 34, 40 and 41 for nesting of a hinged blind unit 69 therein, each comprising an inner blind panel 70 hinged to the opening frame and an outer blind panel 71 hinged to the inner panel 70. Each of the blind panels 70 and 71 conform to the dimension of the openings 33, 34, 40 and 41 and are designed to be opened outwardly to the position illustrated in Figs. 1 and 5 when the trailer is set up for use. A ramp unit 72 is removably associated with each opening 33, 34, 40 and 41 comprising a rectangular floor section 73 of expanded metal having depending flanges 74 and an inclined ramp section 75 having a depending flange 76. Suitable metal fittings 77 are secured to the side walls 13 and 14 of the trailer immediately beneath the openings 33, 34, 40 and 41 having upwardly projecting lips adapted to receive the inner flanges 74 of the floor sections 73 between the lips and the adjacent trailer side walls, and similar fittings 78 are provided on the floor sections 73 for coupling the ramp sections 75 thereto in the manner illustrated in Figure 7. The ramp sections 75 have suitable handrails 79 thereon which may be coupled to the free edges of the outer blind panels 71 in any desired manner. Conventional leveling jacks 80 are provided beneath the outer corners of the floor sections 73 of the ramp units and beneath the drawbar 22 for supporting and leveling these members when the trailer is set up for use.

While I have in the above description disclosed a practical embodiment of the invention, it will be understood by those skilled in the art that the disclosure represents an exemplary embodiment and that other re-arrangements of parts cooperable to carry out the inventive concept are to be regarded as within the purview of the invention as claimed.

I claim:

1. A mobile sanitary trailer unit comprising an elongated trailer body forming an enclosure, toilet fixtures housed in said enclosure, wheel means depending below said trailer body and located near the longitudinal center thereof, a pair of retention tanks spaced from each other longitudinally of the trailer body and located substantially symmetrically relative to the transverse axis of said wheel means fore and aft of said axis, means conducting fluid wastes from said toilet fixtures to the retention tank nearest thereto, and equalizing means interconnecting said retention tanks to continuously maintain a substantially equal distribution of fluid wastes in the said pair of retention tanks for preserving balanced loading of the tanks relative to said wheel means axis.

2. A mobile sanitary trailer unit comprising an underframe, an elongated trailer body supported on said underframe having a floor, side walls and a roof forming an enclosure, toilet fixtures housed in said enclosure, wheel means including at least one transverse axle suspended from said underframe in depending relation below said floor and located near the longitudinal center of said trailer body, a pair of rectangular retention tanks of equal capacity and dimensions supported from said underframe in longitudinally spaced relation on opposite sides of said transverse axle and located substantially symmetrically to said axle, means conducting fluid wastes from said toilet fixtures to the retention tank nearest thereto, and equalizing means interconnecting said retention tanks to maintain the quantity of fluid wastes in each of said retention tanks substantially equal to each other at all times.

3. A mobile sanitary trailer unit comprising an underframe, an elongated trailer body supported on said underframe having a floor, side walls and a roof forming an enclosure, toilet fixtures housed in said enclosure, wheel means including at least one transverse axle suspended from said underframe in depending relation below said floor and located near the longitudinal center of said trailer body, a pair of rectangular retention tanks of equal capacity and dimensions supported from said underframe in longitudinally spaced relation on opposite sides of said transverse axle and located substantially symmetrically to said axle, means supporting said pair of retention tanks in horizontal alignment with each other with said retention tanks disposed in downwardly converging planes to dispose the adjacent ends thereof at a lower level than the relatively remote ends thereof, means for conducting fluid wastes from said toilet fixtures to the retention tank nearest thereto, and an equalizing pipe interconnecting the adjacent ends of said retention tanks to each other to provide free communication of fluid wastes therebetween and maintain a substantially equal distribution of fluid wastes in the said pair of retention tanks to preserve substantially balanced loading of the tanks relative to said transverse axle.

4. A mobile sanitary trailer unit comprising an underframe, an elongated trailer body supported on said underframe having a floor, side walls and a roof forming an enclosure, transverse partition means within said enclosure forming men's and women's toilet compartments at opposite ends of said trailer body spaced apart by a utility compartment, toilet fixtures housed in said men's and women's toilet compartments, said utility compartment having air heater, water storage, and water pump means therein, wheel means including transverse axle means suspended in depending relation from said underframe and located near the longitudinal center of said trailer body, said men's and women's toilet compartments being of substantially equal extent and spaced symmetrically on opposite sides of said transverse axle means, a pair of retention tanks of equal capacity and dimensions suspended from said underframe below said floor and spaced longitudinally of the trailer body in substantially symmetrical relation to said transverse axle means, one of said retention tanks being disposed immediately below said men's compartment and the other of said retention tanks being disposed immediately below said women's compartment and each being coextensive with the major portion of the area of the floors of said respective toilet compartments, means for conducting fluid wastes from the toilet fixtures in said toilet compartments to the retention tanks located therebeneath, and equalizing means interconnecting said retention tanks to continuously maintain a substantially equal distribution of fluid wastes in the said pair of retention tanks for preserving balanced loading of the tanks relative to said axle means.

5. A mobile sanitary trailer unit comprising an underframe, an elongated trailer body supported on said underframe having a floor, side walls and a roof forming an enclosure, transverse partition means within said enclosure forming men's and women's toilet compartments at opposite ends of said trailer body spaced apart by a utility compartment, toilet fixtures housed in said men's and women's toilet compartments, said utility compartment having air heater, water storage, and water pump means therein, wheel means including transverse axle means suspended in depending relation from said underframe and located near the longitudinal center of said trailer body, said men's and women's toilet compartments being of substantially equal extent and spaced symmetrically on opposite sides of said transverse axle means, a pair of retention tanks of equal capacity and dimensions suspended from said underframe below said floor and spaced longitudinally of the trailer body in substantially symmetrical relation to said transverse axle means, means supporting said pair of retention tanks in horizontal alignment with each other with said retention tanks disposed in downwardly converging planes to dispose the adjacent ends thereof at a lower level than the relatively remote ends thereof, one of said retention tanks being disposed immediately below said men's compartment and the other of said retention tanks being disposed immediately below said women's compartment and each being coextensive with the major portion of the area of the floors of said respective toilet compartments, means for conducting fluid wastes from the toilet fixtures in said toilet compartments to the retention tanks located therebeneath, and an equalizing pipe interconnecting said retention tanks to continuously maintain a substantially equal distribution of fluid wastes in the said pair of retention tanks for preserving balanced loading of the tanks relative to said axle means.

6. A mobile sanitary trailer unit comprising an underframe, an elongated trailer body having a floor, side walls and a roof forming an enclosure, transverse partitions within said enclosure dividing the same into longitudinally spaced men's and women's toilet compartments located at opposite ends of said trailer body and an intermediate utility compartment, toilet fixtures in said toilet compartments, wheel means for said trailer body, said side walls each having rectangular door openings therein forming entrance and exit openings for each of said toilet compartments, door frames bounding said openings, hinged blind panels associated with each of said door openings including a first rectangular panel section hinged at one vertical edge thereof to the door frame and a second rectangular panel section hinged to the opposite vertical edge of said first panel section, said blind panels being adapted to be folded into a blind forming position relative to the door opening wherein the first panel projects outwardly from the adjacent trailer side wall in perpendicular relation thereto and the second panel section projects therefrom in spaced parallelism with the trailer side wall in overlying relation to the associated door opening, said panel sections each being complementary to the door opening and the door opening being of sufficient depth to accommodate said first and second panel sections associated therewith in nested relation within the door opening with said first and second panels folded into overlying relation to each other.

7. A mobile sanitary trailer unit comprising an underframe, an elongated trailer body having a floor, side walls and a roof forming an enclosure, a toilet compartment located in said trailer body, toilet fixtures in said toilet compartment, wheel means for said trailer body, at least one of said side walls having a rectangular door opening therein providing access to said toilet compartment, a door frame bounding said door opening, hinged blind panels associated with said door opening including a first rectangular panel hinged at one vertical edge thereof to the door frame and a second rectangular panel hinged to the opposite vertical edge of said first panel, said blind panels being adapted to be folded into a blind-forming position relative to the door opening, wherein the first panel projects outwardly from the adjacent trailer side wall in perpendicular relation thereto and the second panel projects therefrom in spaced parallelism with the trailer side wall in overlying relation to said door opening, said panels each being complementary to the door opening, and the door opening being of sufficient depth to accommodate said first and second panels associated therewith in nested relation within the door opening with said first and second panels folded into overlying relation to each other.

References Cited in the file of this patent

UNITED STATES PATENTS

| 2,514,230 | Feasel | July 4, 1950 |
| 2,772,420 | Carter | Dec. 4, 1956 |

FOREIGN PATENTS

| 689,050 | Great Britain | Mar. 3, 1953 |
| 824,330 | Rappold et al. | Dec. 10, 1951 |